United States Patent
Jung

(10) Patent No.: US 9,015,459 B2
(45) Date of Patent: Apr. 21, 2015

(54) METHOD OF INITIALIZING OPERATION OF A MEMORY SYSTEM

(75) Inventor: Young-Jae Jung, Seoul (KR)

(73) Assignee: Samsung Electronics Co., Ltd. (KR)

( * ) Notice: Subject to any disclaimer, the term of this patent is extended or adjusted under 35 U.S.C. 154(b) by 342 days.

(21) Appl. No.: 13/560,335

(22) Filed: Jul. 27, 2012

(65) Prior Publication Data

US 2013/0042095 A1   Feb. 14, 2013

(30) Foreign Application Priority Data

Aug. 10, 2011  (KR) .......................... 10-2011-0079727

(51) Int. Cl.
*G06F 9/24*    (2006.01)
*G06F 15/177*  (2006.01)
*G06F 9/44*    (2006.01)

(52) U.S. Cl.
CPC ................ *G06F 9/24* (2013.01); *G06F 9/4401* (2013.01)

(58) Field of Classification Search
CPC ................................. G06F 9/24; G06F 9/4401
USPC .................................................. 713/1, 2, 100
See application file for complete search history.

(56) References Cited

U.S. PATENT DOCUMENTS

| | | | |
|---|---|---|---|
| 6,079,016 A * | 6/2000 | Park ................................. 713/2 |
| 6,219,828 B1 * | 4/2001 | Lee ................................ 717/129 |
| 6,363,492 B1 * | 3/2002 | James et al. ........................ 714/1 |
| 6,442,067 B1 * | 8/2002 | Chawla et al. ............ 365/185.11 |
| 6,996,005 B2 | 2/2006 | Mori et al. |
| 7,298,649 B2 | 11/2007 | Mori et al. |
| 7,376,870 B2 * | 5/2008 | Kataria et al. ................ 714/47.1 |
| 7,483,297 B2 | 1/2009 | Mori et al. |
| 7,895,529 B1 * | 2/2011 | Simons et al. ................. 715/810 |
| 2003/0005277 A1 * | 1/2003 | Harding et al. .................... 713/2 |
| 2003/0076311 A1 * | 4/2003 | Lin et al. ......................... 345/204 |
| 2003/0126511 A1 * | 7/2003 | Yang et al. ...................... 714/39 |
| 2004/0181656 A1 * | 9/2004 | Stern et al. ........................ 713/1 |
| 2009/0228641 A1 | 9/2009 | Kurashige |
| 2012/0079260 A1 * | 3/2012 | Yin et al. ........................... 713/2 |

FOREIGN PATENT DOCUMENTS

| | | |
|---|---|---|
| JP | 2004258946 | 9/2004 |
| JP | 2010513993 A | 4/2010 |
| KR | 1020040076589 A | 9/2004 |
| KR | 1020080023841 A | 3/2008 |

* cited by examiner

*Primary Examiner* — Mark Connolly
(74) *Attorney, Agent, or Firm* — Myers Bigel Sibley & Sajovec, PA

(57) ABSTRACT

Provided is a method of initializing operation of a memory system. The method includes receiving an initialization signal, performing a first initializing operation that uses initialization data in response to the receiving of the initialization signal, setting a forced reset mode when an operation standby signal is not enabled by the first initializing operation, and performing a second initializing operation that does not use the initialization data in response to the setting of the forced reset mode.

19 Claims, 11 Drawing Sheets

METHOD OF INITIALIZING OPERATION OF A MEMORY SYSTEM

CROSS-REFERENCE TO RELATED APPLICATION

This application claims priority under 35 U.S.C. §119 to Korean Patent Application No. 10-2011-0079727 filed on Aug. 10, 2011, the disclosure of which is hereby incorporated by reference in its entirety.

BACKGROUND

1. Field

Embodiments of the inventive concept relate to a method of initializing operation for a memory system.

2. Description of Related Art

An initializing operation of conventional memory systems includes executing a boot code stored in the starting memory of a controller, checking initialization data stored in a non-volatile memory device in response to the execution of the boot code, loading the initialization data onto a working memory of the controller, and executing the initialization data loaded onto the working memory. That is, the conventional memory systems load and execute the initialization data onto the working memory when the initialization data is stored in the non-volatile memory device.

As such, when the initialization data is stored in a bad cell or when the initialization data is damaged, for instance, by abrupt power off during a patch update for updating the initialization data, an operation standby signal may not be enabled by the execution of the initialization data. In this case, the conventional memory systems may fail to terminate the initializing operation, so that, although there is no special abnormality in the non-volatile memory device or the controller, the non-volatile memory device or the controller is determined to be a recognition failure by the host and thus a user cannot use a product.

SUMMARY

When initialization data is stored in a bad cell, or when initialization data is damaged, for instance, by power shutting off suddenly during patch update for updating the initialization data, an operation standby signal is not enabled by execution of the initialization data. In this case, a conventional memory system fails to terminate an initializing operation and, although there is no particular abnormality in a non-volatile memory device or a controller, the non-volatile memory device or the controller is deemed a failure by the host, and thus a user cannot use the particular product. When this problem occurs during the manufacturing process, recovery may be difficult. Although recovery is partially possible depending on the type of product, an extra process using special manufacturing facilities rather than ordinary manufacturing facilities may be required. As such, temporal and financial losses may occur.

Thus, embodiments of the inventive concept provide a method of initializing operation for a memory system which deals with recognition failure during an initializing operation in a user environment, thereby making it possible to improve the convenience of a product in aspects of manufacturing and usage.

The technical objectives of the inventive concept are not limited to the above disclosure; other objectives may become apparent to those of ordinary skill in the art based on the following descriptions.

In accordance with an aspect of the inventive concept, a method of initializing operation for a memory system includes receiving an initialization signal from a host. A boot code stored in a starting memory of a controller is executed in response to the receiving of the initialization signal. Initialization data stored in a non-volatile memory device is loaded onto a working memory of the controller in response to the execution of the boot code. The initialization data loaded onto the working memory is executed. The boot code is re-executed when an operation standby signal is not enabled by the execution of the initialization data. The initialization data stored in the non-volatile memory device is erased after the boot code is re-executed.

In an embodiment, the method may further include updating new initialization data into the non-volatile memory device after the initialization data is erased, loading the updated initialization data onto the working memory, and executing the updated initialization data loaded onto the working memory.

In another embodiment, updating the new initialization data may include inquiring of the host whether to update the new initialization data, and updating the new initialization data by command of the host.

In still another embodiment, erasing the initialization data may include initializing the non-volatile memory device.

In yet another embodiment, initializing the non-volatile memory device may include inquiring of the host whether to initialize the non-volatile memory device, and initializing the non-volatile memory device by command of the host.

In yet another embodiment, initializing the non-volatile memory device may include informing that the boot code is re-executed prior to inquiring of the host whether to initialize the non-volatile memory device.

In yet another embodiment, the method may further include loading preliminary initialization data stored in the non-volatile memory device onto the working memory after the initialization data is erased, and executing the preliminary initialization data loaded onto the working memory.

In yet another embodiment, the method may further include checking whether the preliminary initialization data is stored in the non-volatile memory device prior to loading the preliminary initialization data onto the working memory.

In yet another embodiment, the method may further include backing up the initialization data to the host when the operation standby signal is enabled by the execution of the initialization data.

In yet another embodiment, the method may further include loading the backup initialization data stored in the host onto the working memory after the initialization data is erased, and executing the backup initialization data loaded onto the working memory.

In yet another embodiment, loading the backup initialization data onto the working memory may include copying the backup initialization data into the non-volatile memory device, and loading the backup initialization data copied into the non-volatile memory device onto the working memory.

In yet another embodiment, the method may further include checking whether the backup initialization data is stored in the host prior to loading the backup initialization data onto the working memory.

In accordance with another aspect of the inventive concept, a method of initializing operation a memory system includes receiving an initialization signal. A first initializing operation that uses initialization data is performed in response to the receiving of the initialization signal. A second initializing operation that does not use the initialization data is performed when an operation standby signal is not enabled by the first initializing operation.

In an embodiment, performing the first initializing operation may include executing boot code stored in a starting memory of a controller. Performing the second initializing operation may include setting a forced reset mode (FRM), executing preliminary boot code stored in the starting memory of the controller in response to the setting of the FRM, and erasing the initialization data.

In another embodiment, performing the second initializing operation may further include inquiring of the host whether or not to update new initialization data after the initialization data is erased, updating the new initialization data to the non-volatile memory device by command of the host, loading the updated initialization data onto a working memory of the controller, and executing the updated initialization data loaded onto the working memory.

In the method of initializing operation for the memory system according to the inventive concept, when the operation standby signal is not enabled by the first initializing operation that uses the initialization data, the second initializing operation that does not use the initialization data may be performed. Thus, the method of initializing the memory system is able to deal with recognition failure in a user environment, thereby improving the convenience of a product in aspects of manufacturing and usage.

BRIEF DESCRIPTION OF THE DRAWINGS

The foregoing and other features and advantages of the inventive concepts will be apparent from the more particular description of embodiments of the inventive concepts, as illustrated in the accompanying drawings in which like reference characters refer to the same parts throughout the different views. The drawings are not necessarily to scale, emphasis instead being placed upon illustrating the principles of the inventive concepts. In the drawings.

DETAILED DESCRIPTION OF THE EMBODIMENTS

Figure 1:
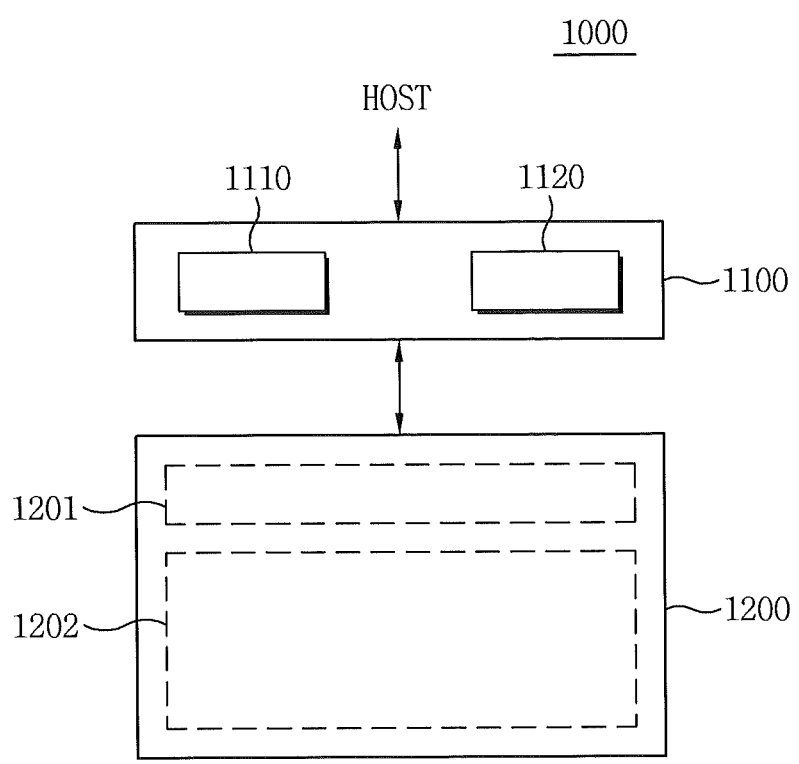
FIG. 1 shows the architecture of a memory system according to a first embodiment of the inventive concept.

Various embodiments will now be described more fully with reference to the accompanying drawings in which some embodiments are shown. These inventive concepts may, however, be embodied in different forms and should not be construed as limited to the embodiments set forth herein. Rather, these embodiments are provided so that this disclosure is thorough and complete, and fully conveys the inventive concept to those skilled in the art. In the drawings, the sizes and relative sizes of layers and regions may be exaggerated for clarity.

It will be understood that when an element or layer is referred to as being "on," "connected to" or "coupled with" another element or layer, it can be directly on, connected or coupled with the other element or layer or intervening elements or layers may be present. In contrast, when an element is referred to as being "directly on," "directly connected to" or "directly coupled with" another element or layer, there are no intervening elements or layers present. Like numerals refer to like elements throughout the description. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-sectional illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present inventive concept.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Embodiments of the inventive concept provide a method of initializing operation for a memory system, which is capable of dealing with component recognition failure caused by damage to the initialization data in a user environment by setting a forced reset mode (FRM) when the operation standby signal may not be enabled by the initializing operation using the initialization data. The initializing operation is then performed without using the initialization data.

In addition, in the method of initializing operation for the memory system according to the inventive concept, when the FRM is set after the initialization data is backed up to a host, which is used for the initializing operation where the operation standby signal is enabled, the initializing operation may be performed using the initialization data backed up to the host.

First Embodiment

FIG. 1 shows the architecture of a memory system according to a first embodiment of the inventive concept.

Referring to FIG. 1, a memory system 1000 according to the first embodiment of the inventive concept may include a controller 1100 and a non-volatile memory device 1200. The non-volatile memory device 1200 may be controlled by the controller 1100. The controller 1100 may be connected between a host and the non-volatile memory device 1200.

The controller 1100 may be configured to store data, transmitted from the host, in the non-volatile memory device 1200 by command of the host. The controller 110 may be configured to transmit data, stored in the non-volatile memory device 1200, to the host by command of the host.

The controller 1100 may include a protocol for exchanging data with the host. That is, the controller 1100 may exchange data with the host using one of various interface protocols such as Universal Serial Bus (USB), MultiMediaCard (MMC), Peripheral Component Interconnect (PCI) Express (PCI-E), Advance Technology Attachment (ATA), Serial-ATA, Parallel-ATA, Small Computer System Interface (SCSI), Enhanced Small Device Interface (ESDI), and Integrated Drive Electronics (IDE). The controller 1100 may exchange data with other external elements using one of various interface protocols.

The controller 1100 may include a starting memory 1110 and a working memory 1120. The starting memory 1110 may be a read only memory (ROM). The working memory 1120 may be a random access memory (RAM).

The starting memory 1110 may be a non-volatile memory. For example, the starting memory 1110 may be a NOR flash memory, a phase-change RAM (PRAM), a resistance-change RAM (RRAM), or a magnetoresistive RAM (MRAM).

The working memory 1120 may be a volatile memory. For example, the working memory 1120 may be a dynamic RAM (DRAM), a static RAM (SRAM), or a synchronous dynamic RAM (SDRAM).

The starting memory 1110 may have a boot code stored therein. The boot code may include minimum commands for an initializing operation. For example, the boot code may include minimum commands for loading initialization data stored in the non-volatile memory device 1200 onto the working memory 1120.

Here, an initializing operation means setting the memory system 1000 according to the first embodiment of the inventive concept to a usable state. The initializing operation means system booting of the memory system 1000 according to the first embodiment of the inventive concept. That is, the memory system 1000 according to the first embodiment of the inventive concept may be set to a state in which it can exchange data by command of the host by the initializing operation.

The non-volatile memory device 1200 may include a first block 1201 and a second block 1202, both of which are intended to store data different from each other. The non-volatile memory device 1200 may include a NAND flash memory, a PRAM, an RRAM, an MRAM, or a combination thereof.

The first block 1201 may be stored with the initialization data. The initialization data may include all data for the initializing operation of the memory system 1000 according to the first embodiment of the inventive concept. The initialization data may be firmware for the memory system 1000 according to the first embodiment of the inventive concept. The initialization data may be created or updated by patch update conducted after the initializing operation of the memory system 1000 is completed according to the first embodiment of the inventive concept.

The initialization data may include a main code. The main code may include commands for the boot code. For example, the main code may include commands for performing data reading, writing or erasing operation on the non-volatile memory device 1200 by command of the host.

The initialization data may further include commands for allowing the controller 1100 to control the non-volatile memory device 1200 by command of the host. For example, the initialization data may include commands for performing background operations, such as garbage collection, data merge, and wear leveling.

The second block 1202 may be stored with user data. User data may mean data that can be arbitrarily written, read out, and erased by a user. For example, user data may include text data, audio data, image data, and operating system (OS).

Figure 2:
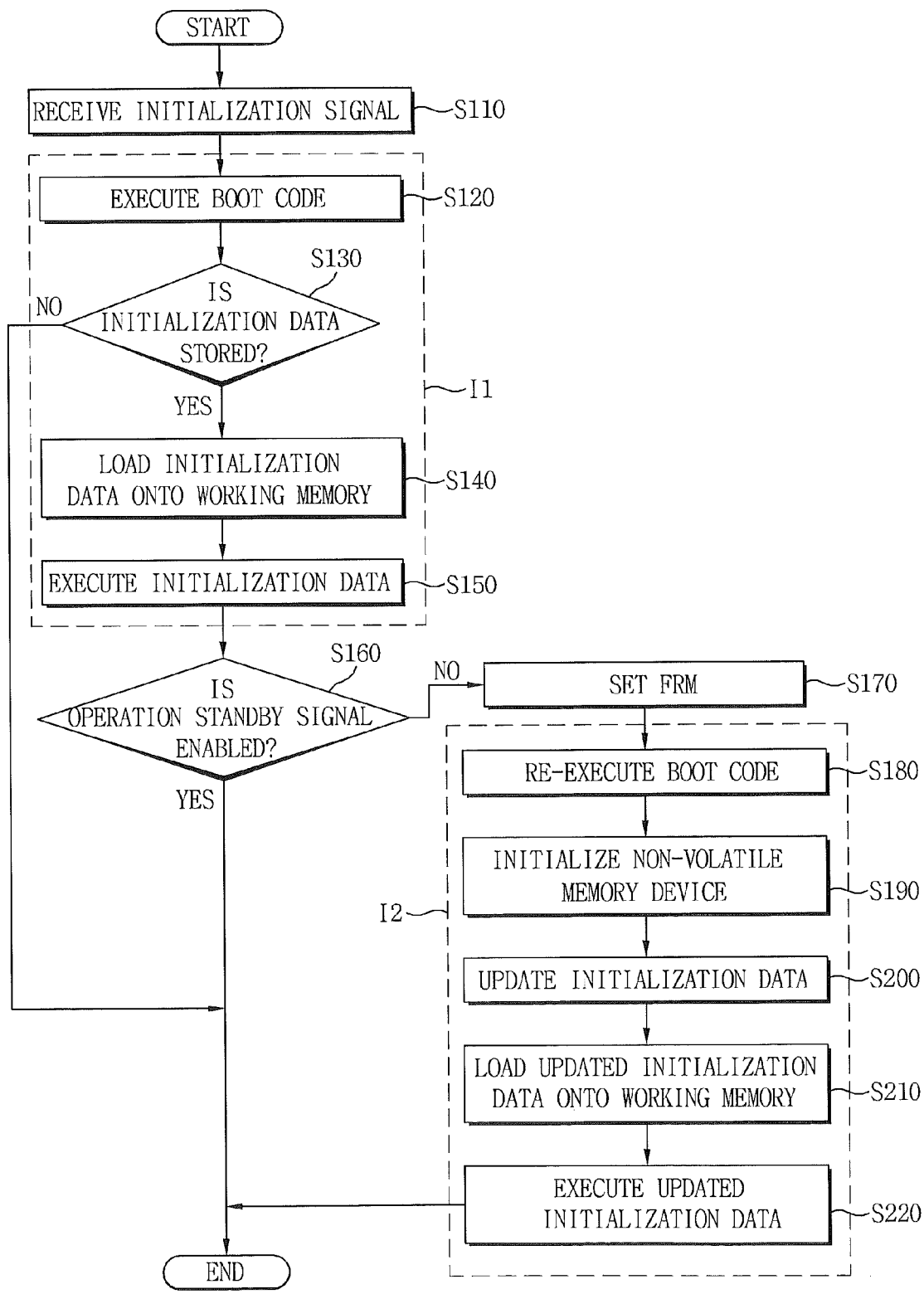
FIG. 2 is a flowchart showing a method of initializing operation for the memory system according to the first embodiment of the inventive concept.

FIG. 2 is a flowchart showing a method of initializing operation for the memory system according to the first embodiment of the inventive concept.

The method of initializing operation for the memory system 1000 according to the first embodiment of the inventive concept will be described with reference to FIGS. 1 and 2. First, the method of initializing operation for the memory system 1000 according to the first embodiment of the inventive concept may include the memory system 1000 receiving an initialization signal (S100).

The initialization signal may be transmitted from the host to the memory system 1000. For example, the initialization signal may be a power-on signal or a reset signal that is transmitted from the host to the memory system 1000.

Subsequently, a boot code is executed (S120) in response to the receiving of the initialization signal. The boot code may be stored in the starting memory 1110 of the controller 1100. The starting memory 1110 may be a ROM. Thus, execution of the boot code may refer to ROM booting.

Next, the method of initializing operation for the memory system 1000 further comprises checking whether or not initialization data is stored in the first block 1201 of the non-volatile memory device 1200 in response to the execution of the boot code by the controller 1100 (S130).

Checking whether or not initialization data is stored in the first block 1201 of the non-volatile memory device 1200 may be automatically performed without command of the controller 1100 by the execution of the boot code.

When it is confirmed that the initialization data is not stored in the first block 1201 of the non-volatile memory device 1200, it may be regarded that patch update is not conducted even once on the memory system 1000. Thus, when the initialization data is not stored in the first block 1201, the memory system 1000 may terminate the initializing operation.

When it is confirmed that the initialization data is stored in the first block 1201, the method of initializing operation for the memory system 1000 further comprises loading the initialization data stored in the first block 1201 onto the working memory 1120 of the controller 1100 (S140).

Subsequently, initializing the memory system 1000 may comprise executing the initialization data loaded onto the working memory 1120 (S150). The working memory 1120 may be a RAM. Thus, execution of the initialization data may refer to RAM booting.

In some embodiments according to the inventive concept, operations S120, S140, and S150 may be defined as a first initializing operation I1. That is, the first initializing operation I1 may be an initializing operation using the initialization data.

The method of initializing operation for the memory system 1000 may further comprise checking whether or not an operation standby signal of the memory system 1000 is enabled by the execution of the initialization data (S160).

That the operation standby signal is enabled may mean the memory system 100 is in a state in which the memory system 1000 may execute the command of the host. Thus, when the operation standby signal is enabled, the memory system 1000 may terminate the initializing operation. The operation standby signal may be a ready signal or a busy signal that is transmitted from the controller 1100 to the host.

When it is confirmed that the operation standby signal is not enabled, the method of initializing operation for the memory system 1000 may further comprise setting a forced reset mode (FRM) (S170). The FRM may be set by the controller 1100 of the memory system 1000.

That the operation standby signal is not enabled may mean that the initialization data loaded onto the working memory 1120 is not normally executed, or that the initialization data loaded onto the working memory 1120 is not normally operated. For example, when the initialization data is not fully updated due to an unexpected power-off of the memory system 1000 during a patch update, the initialization data is not normally executed or operated. This may mean that the initializing operation is not normally terminated. Thus, the host may not recognize the memory system 1000.

Accordingly, when the operation standby signal by the first initializing operation I1 is not enabled, the memory system 1000 may set the FRM.

The method of initializing operation for the memory system 1000 may further comprise re-executing the boot code according to the setting of the FRM (S180). To re-execute the boot code may mean re-executing the boot code stored in the starting memory 1110 according to the setting of the FRM of the memory system 1000.

The initialization data loaded onto the working memory 1120 may be erased by re-executing the boot code according to the setting of the FRM.

The method of initializing operation for the memory system 1000 may further include initializing the non-volatile memory device 1200 after the boot code is re-executed (S190).

To initialize the non-volatile memory device 1200 may mean erasing the initialization data and the user data stored in the non-volatile memory device 1200. Thus, the memory system 1000 according to the first embodiment of the inventive concept may be the same as the case where the patch update is not performed at all.

The method of initializing operation for the memory system 1000 may further include updating new initialization data on the first block 1201 of the non-volatile memory device 1200, after the non-volatile memory device 1200 is initialized (S200).

The new initialization data may be updated using the host. For example, the method of initializing operation for the memory system 1000 may update an up-to-date version of firmware using a patch server connected with the host.

Then, the method of initializing operation for the memory system 1000 may further comprise loading the initialization data, which has been updated on the first block 1201 of the non-volatile memory device 1200, onto the working memory 1120 (S210).

The working memory 1120 may be a volatile memory. Thus, the working memory 1120 may be in a state where the previously loaded initialization data is erased by the re-execution of the boot code. That is, the working memory 1120 may be in a state where only the updated initialization data is loaded.

The method of initializing operation for the memory system 1000 may further comprise executing the updated initialization data loaded onto the working memory 1120 (S220).

In some embodiments according to the inventive concept, operations S180, S190, S200, S210, and S220 may be defined as a second initializing operation I2. That is, the second initializing operation I2 may be an initializing operation that does not use the initialization data.

Thus, the method of initializing operation for the memory system 1000 according to the first embodiment of the inventive concept may perform the first initializing operation I1 using the initialization data according to the initialization signal. When the operation standby signal is not enabled by the first initializing operation I1, the FRM is set, and then the second initializing operation I2 that does not use the initialization data, may be performed. Thus, the method of initializing operation for the memory system 1000 according to the first embodiment of the inventive concept may allow the problem of the host failing to recognize the memory system 1000 due to the initialization data, to be overcome in a user environment.

The method of initializing operation for the memory system 1000 according to the first embodiment of the inventive concept may terminate the initializing operation in response to the performing of the second initializing operation I2 and wait for command from the host.

Second Embodiment

Figure 3:
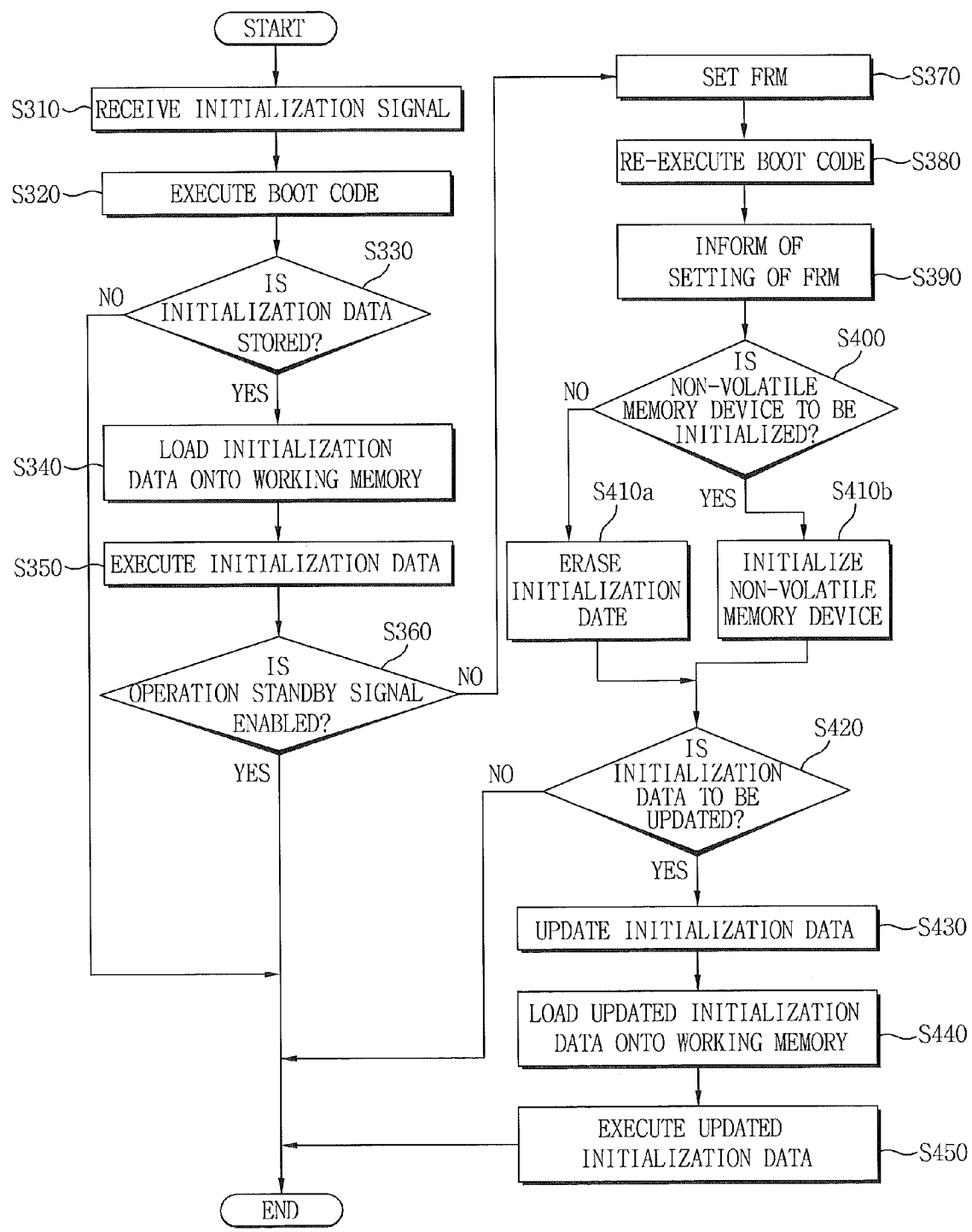
FIG. 3 is a flowchart showing a method of initializing operation for a memory system according to a second embodiment of the inventive concept.

FIG. 3 is a flowchart showing a method of initializing operation for a memory system according to a second embodiment of the inventive concept.

Hereinafter, the method of initializing operation for the memory system according to the second embodiment of the inventive concept will be described with reference to FIGS. 1 and 3, centering on differences from the method of initializing operation for the memory system according to the first embodiment of the inventive concept.

Referring to FIGS. 1 and 3, the method of initializing operation for the memory system 1000 according to the second embodiment of the inventive concept may include receiving an initialization signal (S310), executing a boot code in response to the receiving of the initialization signal (S320), checking whether or not initialization data is stored in the first block 1201 of the non-volatile memory device 1200 (S330), loading the initialization data stored in the first block 1201 onto the working memory 1120 (S340), executing the initialization data loaded onto the working memory 1120 (S350), and checking whether or not an operation standby signal is enabled by the execution of the initialization data (S360).

The method of initializing operation for the memory system 1000 may include setting an FRM when the operation standby signal is not enabled by the execution of the initialization data (S370).

When the operation standby signal is enabled, the memory system 1000 may terminate the initializing operation and wait for the command of the host.

The method of initializing operation for the memory system 1000 may include re-executing the boot code in response to the setting of the FRM (S380).

The method of initializing operation for the memory system 1000 may include informing the host of the setting of the FRM (S390).

To inform the host of the setting of the FRM may include informing that the boot code is re-executed in response to the setting of the FRM. Thus, the method of initializing operation for the memory system 1000 may inform the user that the host fails to recognize the memory system 1000.

Subsequently, the method of initializing operation for the memory system 1000 may include inquiring of the host whether to initialize the non-volatile memory device 1200 (S400).

In the method of initializing operation for the memory system 1000, prior to inquiring of the host whether to initialize the non-volatile memory device 1200, the host may be informed that the FRM is set. However, the embodiments of the inventive concept are not limited to this configuration. In the method of initializing operation for the memory system 1000, without informing the host that the FRM is set, the host may be inquired of whether to initialize the non-volatile memory device 1200.

The method of initializing operation for the memory system 1000 may include erasing only the initialization data stored in the first block 1201 of the non-volatile memory device 1200 by command of the host (S410a). In detail, in the method of initializing operation for the memory system 1000, a command that the non-volatile memory device 1200 should not be initialized is transmitted from the host, and the initialization data stored in the first block 1201 may be erased.

The method of initializing operation for the memory system 1000 may include initializing the non-volatile memory device 1200 by command of the host (410b).

Subsequently, the method of initializing operation for the memory system 1000 may include inquiring of the host whether to update new initialization data (S420). When a command that the new initialization data should not be updated is transmitted from the host, the memory system 1000 may terminate the initializing operation and wait for command from the host.

The method of initializing the memory system 1000 may include updating the new initialization data on the first block 1201 of the non-volatile memory device 1200 by command of the host (S430). The new initialization data may be an up-to-date version of firmware.

Subsequently, the method of initializing operation for the memory system 1000 may include loading the initialization data updated on the first block 1201 onto the working memory 1120 (S440).

Then, the method of initializing operation for the memory system 1000 may include executing the updated initialization data loaded onto the working memory 1120 (S450).

Subsequently, the method of initializing operation for the memory system 1000 may terminate the initializing operation and wait for command from the host.

Third Embodiment

Figure 4:
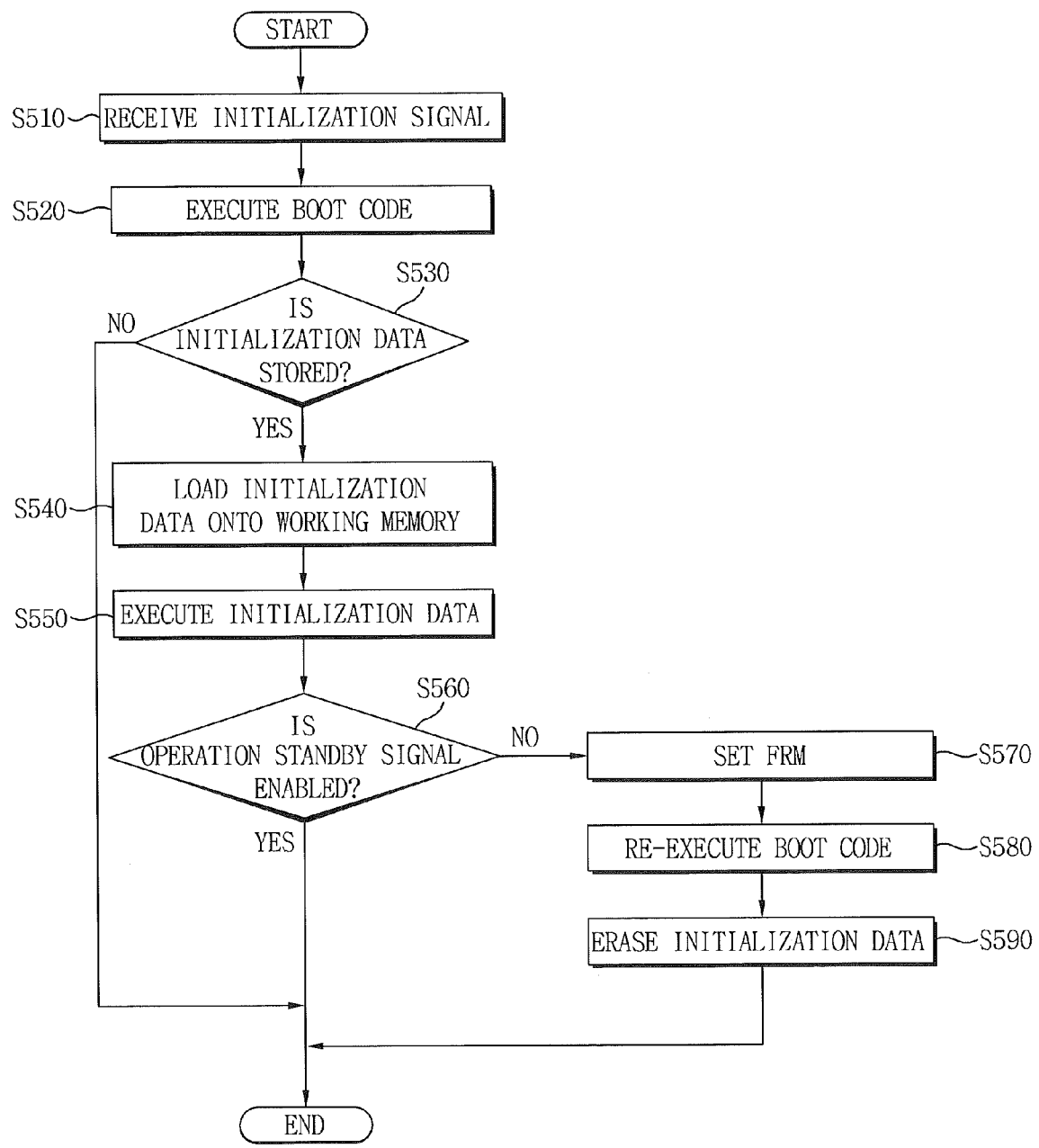
FIG. 4 is a flowchart showing a method of initializing operation for a memory system according to a third embodiment of the inventive concept.

FIG. 4 is a flowchart showing a method of initializing operation for a memory system according to a third embodiment of the inventive concept.

Hereinafter, the method of initializing operation for the memory system according to the third embodiment of the inventive concept will be described with reference to FIGS. 1 and 4, centering on differences from the method of initializing operation for the memory system according to the first embodiment of the inventive concept.

Referring to FIGS. 1 and 4, the method of initializing operation for the memory system 1000 according to the third embodiment of the inventive concept may include receiving an initialization signal (S510), executing a boot code in response to the receiving of the initialization signal (S520), checking whether or not initialization data is stored in the first block 1201 of the non-volatile memory device 1200 (S520), loading the initialization data stored in the first block 1201 onto the working memory 1120 (S540), executing the initialization data loaded onto the working memory 1120 (S550), and checking whether or not an operation standby signal is enabled by the execution of the initialization data (S560).

The method of initializing operation for the memory system 1000 may include setting an FRM when the operation standby signal is not enabled by the execution of the initialization data (S570).

The method of initializing operation for the memory system 1000 may include re-executing the boot code in response to the setting of the FRM (S580).

The method of initializing operation for the memory system 1000 may include erasing the initialization data stored in the first block 1201 of the non-volatile memory device 1200 after the boot code is re-executed (S590).

Fourth Embodiment

Figure 5:
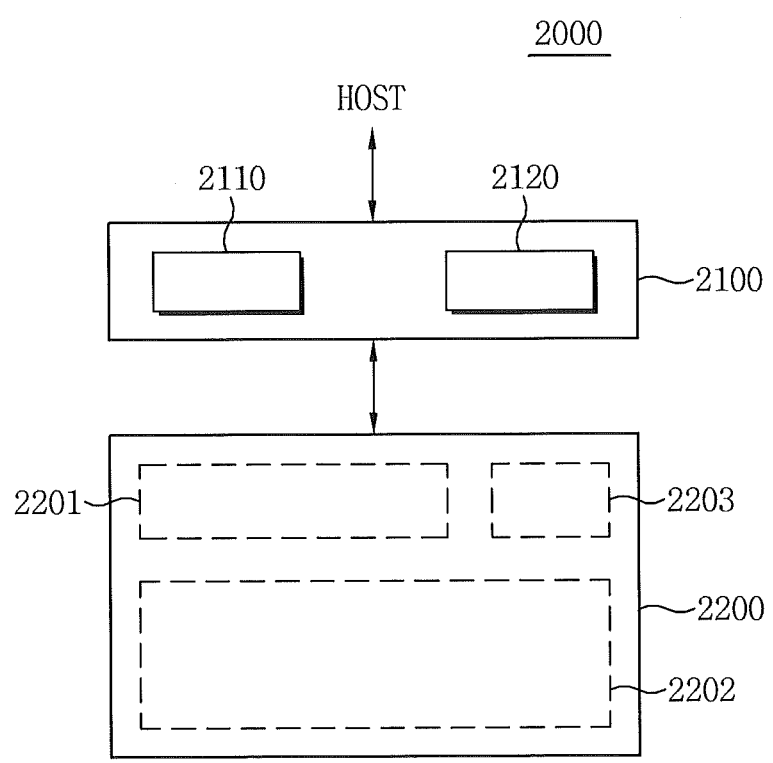
FIG. 5 shows the architecture of a memory system according to a fourth embodiment of the inventive concept.

FIG. 5 shows the architecture of a memory system according to a fourth embodiment of the inventive concept.

Referring to FIG. 5, a memory system 2000 according to the fourth embodiment of the inventive concept may include a controller 2100 and a non-volatile memory device 2200 controlled by the controller 2100. The controller 2100 may be connected between a host and the non-volatile memory device 2200.

The controller 2100 may include a starting memory 2110 and a working memory 2120. The non-volatile memory device 2200 may include first, second and third blocks 2201, 2202 and 2203 that store different data.

The controller 2100, the starting memory 2110, the working memory 2120, the non-volatile memory device 2200, the first block 2201, and the second block 2202 of the memory system 2000, according to the fourth embodiment of the inventive concept, may be understood to be the same components as the controller 1100, the starting memory 1110, the working memory 1120, the non-volatile memory device 1200, the first block 1201, and the second block 1202 of the memory system 1000 according to the first embodiment of the inventive concept. Thus, detailed description of the former components may be replaced with the content disclosed in the first embodiment of the inventive concept.

The third block 2203 of the non-volatile memory device 2200 may be stored with preliminary initialization data. The preliminary initialization data may be an up-to-date version of firmware at the time when the product is put on the market, for example. That is, the preliminary initialization data may be a first version of firmware. The preliminary initialization data may be the backup of initialization data used for an initializing operation in which an operation standby signal is enabled. The preliminary initialization data may include only a main code of the initialization data.

The third block 2203 may include an error correcting code (ECC). The ECC may correct errors on bad memory cells of the non-volatile memory device, thereby increasing the frequency of writing and erasing operations with respect to the non-volatile memory device.

Figure 6:
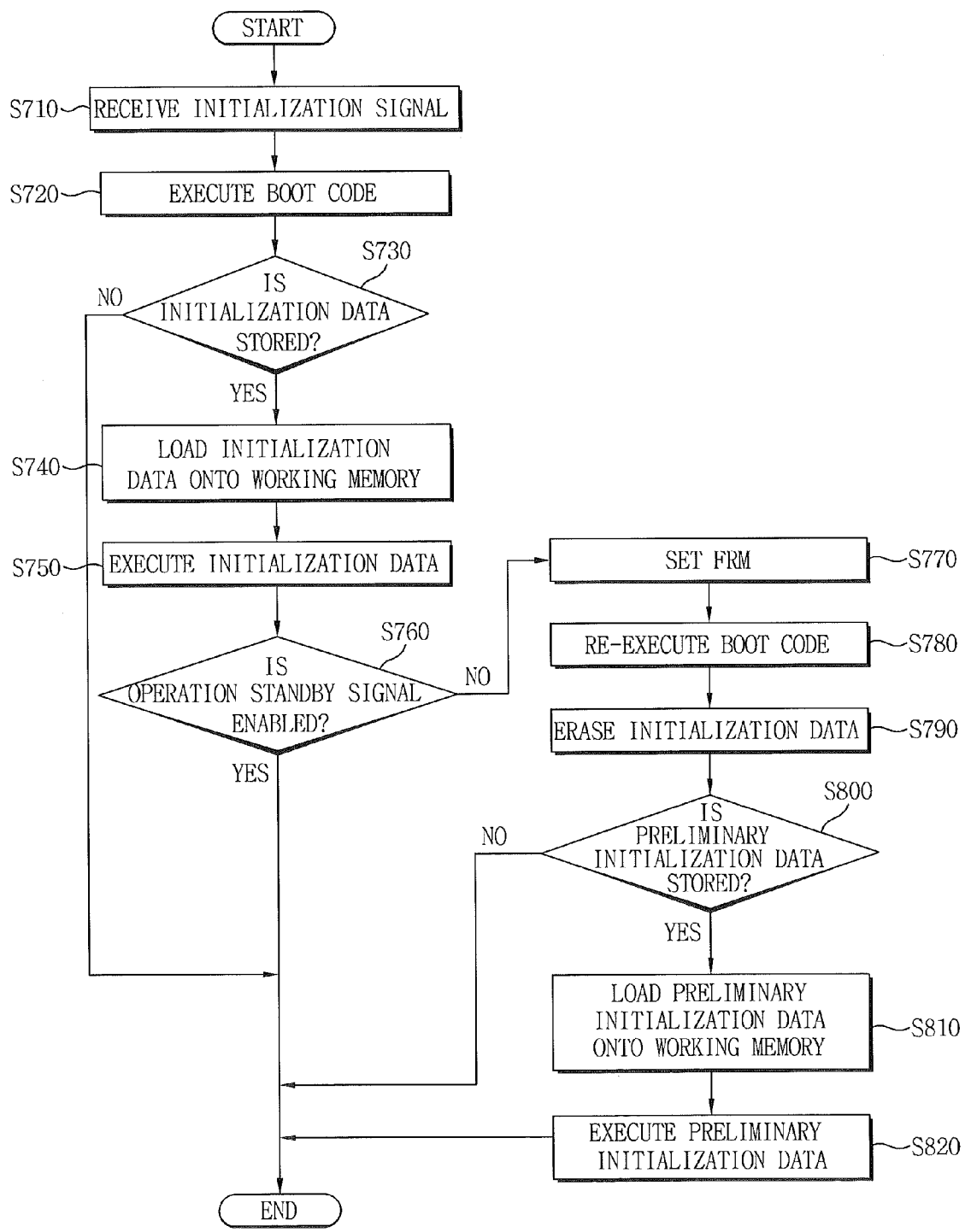
FIG. 6 is a flowchart showing a method of initializing operation for the memory system according to the fourth embodiment of the inventive concept.

FIG. 6 is a flowchart showing a method of initializing operation for the memory system 2000 according to the fourth embodiment of the inventive concept.

Hereinafter, the method of initializing operation for the memory system according to the fourth embodiment of the inventive concept will be described with reference to FIGS. 5 and 6, centering on differences from the method of initializing operation for the memory system according to the first embodiment of the inventive concept.

Referring to FIGS. 5 and 6, the method of initializing operation for the memory system 2000 according to the fourth embodiment of the inventive concept may include receiving an initialization signal (S710), executing a boot code in response to the receiving of the initialization signal (S720), of checking whether initialization data is stored in the first block 2201 of the non-volatile memory device 2200 (S730), loading the initialization data stored in the first block 2201 onto the working memory 2120 (S740), executing the initialization data loaded onto the working memory 2120 (S750), and of checking whether an operation standby signal is enabled by the execution of the initialization data (S760).

The method of initializing operation for the memory system 2000 may include setting an FRM when the operation standby signal is not enabled by the execution of the initialization data (S770).

The method of initializing operation for the memory system 2000 may include re-executing the boot code in response to the setting of the FRM (S780).

The method of initializing operation for the memory system 2000 may include erasing the initialization data stored in the first block 2201 of the non-volatile memory device 2200 after the boot code is re-executed (S790).

Here, the memory system 2000 may be configured so that data stored in the third block 2203 of the non-volatile memory device 2200 is not erased by initialization of the non-volatile memory device 2200. In this case, the method of initializing operation for the memory system 2000 may initialize the non-volatile memory device 2200 to erase the initialization data.

The method of initializing operation for the memory system 2000 may include checking whether the preliminary initialization data is stored in the third block 2203 of the non-volatile memory device 2200 (S800).

When the preliminary initialization data is not stored in the third block 2203 of the non-volatile memory device 2200, the memory system 2000 may terminate the initializing operation and wait for command from the host.

The method of initializing operation for the memory system 2000 may include loading the preliminary initialization data stored in the third block 2203 onto the working memory 2120 (S810).

In this manner, the method of initializing operation for the memory system 2000 may check whether the preliminary initialization data is stored in the third block 2203, and then load the preliminary initialization data stored in the third block 2203 onto the working memory 2120. However, the method of initializing operation for the memory system 2000, according to the embodiments of the inventive concept, is not limited to this configuration. For example, the method of initializing operation for the memory system 2000 may load the preliminary initialization data stored in the third block 2203 onto the working memory 2120 without checking whether the preliminary initialization data is stored in the third block 2203.

Further, the method of initializing operation for the memory system 2000 may load the preliminary initialization data stored in the third block 2203 onto the working memory 2120. However, the method of initializing operation for the memory system 2000, according to the embodiments of the inventive concept, is not limited to this configuration. For example, the method of initializing operation for the memory system 2000 may copy the preliminary initialization data stored in the third block 2203 into the first block 2201 of the non-volatile memory device 2200, and then load the preliminary initialization data copied into the first block 2201 onto the working memory 2120.

Subsequently, the method of initializing operation for the memory system 2000 may include executing the preliminary initialization data loaded onto the working memory 2120 (S820).

Then, the method of initializing operation for the memory system 2000 may terminate the initializing operation and wait for command from the host.

Fifth Embodiment

Figure 7:
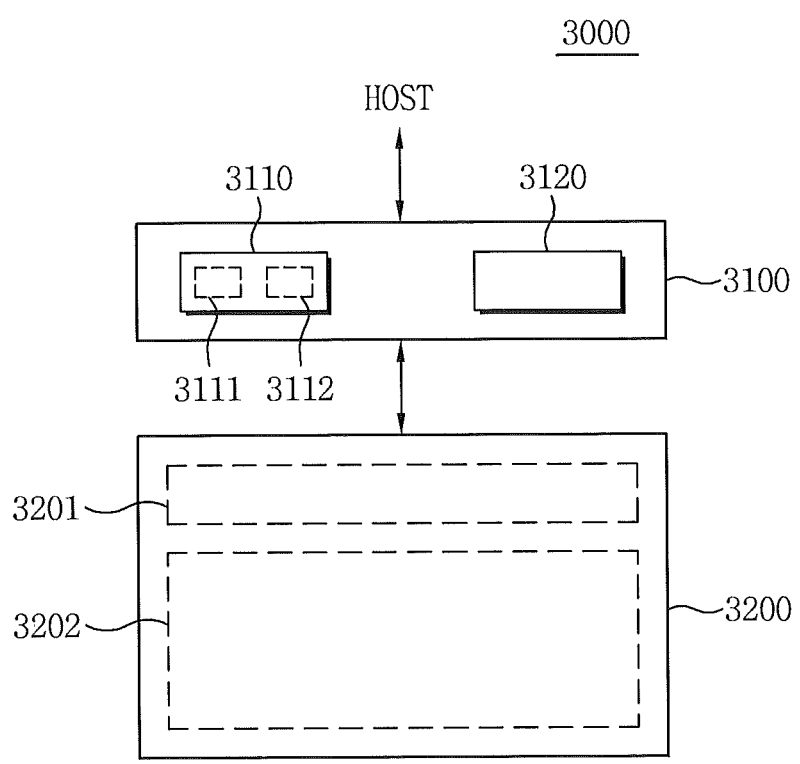
FIG. 7 shows the architecture of a memory system according to a fifth embodiment of the inventive concept.

FIG. 7 shows the architecture of a memory system according to a fifth embodiment of the inventive concept.

Referring to FIG. 7, a memory system 3000 according to the fifth embodiment of the inventive concept may include a controller 3100 and a non-volatile memory device 3200 controlled by the controller 3100. The controller 3100 may be connected between a host and the non-volatile memory device 3200.

The controller 3100 may include a starting memory 3110 and a working memory 3120. The non-volatile memory device 3200 may include first and second blocks 3201 and 3202 that store different data.

The controller 3100, the starting memory 3110, the working memory 3120, the non-volatile memory device 3200, the first block 3201, and the second block 3202 of the memory system 3000, according to the fifth embodiment of the inventive concept, may be understood to be the same components as the controller 1100, the starting memory 1110, the working memory 1120, the non-volatile memory device 1200, the first block 1201, and the second block 1202 of the memory system 1000 according to the first embodiment of the inventive concept. Thus, detailed description of the former components may be replaced with the content disclosed in the first embodiment of the inventive concept.

The starting memory 3110 may include a first region 3111 and a second region 3112. The first region 3111 may be a region for storing a boot code, and the second region 3112 may be a region for storing a preliminary boot code.

The preliminary boot code may be a boot code included in initialization data at the time the product is put on the market. That is, the preliminary boot code may be a boot code included in a first version of firmware.

Figure 8:
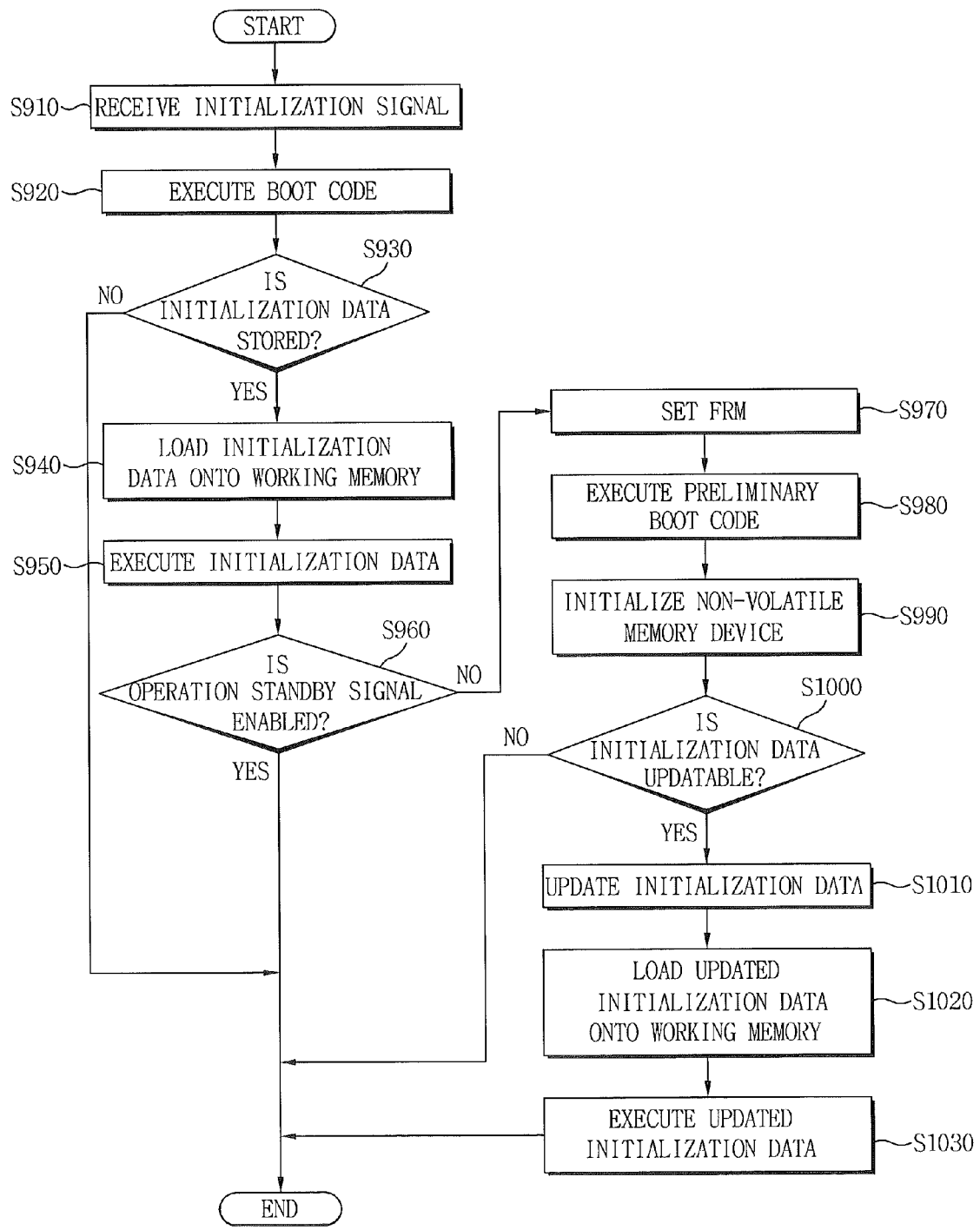
FIG. 8 is a flowchart showing a method of initializing operation for the memory system according to the fifth embodiment of the inventive concept.

FIG. 8 is a flowchart showing a method of initializing operation for the memory system 3000 according to the fifth embodiment of the inventive concept.

Hereinafter, the method of initializing operation for the memory system according to the fifth embodiment of the inventive concept will be described with reference to FIGS. 7 and 8, centering on differences from the method of initializing operation for the memory system according to the first embodiment of the inventive concept.

Referring to FIGS. 7 and 8, the method of initializing operation for the memory system 3000 according to the fifth embodiment of the inventive concept may include receiving an initialization signal (S910), executing the boot code stored in the first region 3111 of the starting memory 3110 in response to the receiving of the initialization signal (S920), checking whether or not initialization data is stored in the first block 3201 of the non-volatile memory device 3200 (S930), loading the initialization data stored in the first block 3201 onto the working memory 3120 (S940), executing the initialization data loaded onto the working memory 3120 (S950), and checking whether an operation standby signal is enabled by the execution of the initialization data (S960).

The method of initializing operation for the memory system 3000 may include setting an FRM when the operation standby signal is not enabled by the execution of the initialization data (S970).

The method of initializing operation for the memory system 3000 may include executing the preliminary boot code stored in the second region 3112 of the starting memory 3110 in response to the setting of the FRM (S980).

That is, the controller 3100 of the memory system 3000 may be configured to execute the boot code stored in the first region 3111 of the starting memory 3110 when the FRM is not set, and to execute the preliminary boot code stored in the second region 3112 of the starting memory 3110 when the FRM is set.

The method of initializing operation for the memory system 3000 may include initializing the non-volatile memory device 3200 after the preliminary boot code is executed (S990).

The method of initializing operation for the memory system 3000 may include checking whether or not new initialization data is updatable (S1000).

When the new initialization data is not updatable, the memory system 3000 may terminate the initializing operation and wait for command from the host.

The method of initializing operation for the memory system 3000 may include updating the new initialization data into the first block 3201 of the non-volatile memory device 3200 (S1010).

The method of initializing operation for the memory system 3000 may include loading the new initialization data updated into the first block 3201 onto the working memory 3120 (S1020).

The method of initializing operation for the memory system 3000 may include executing the updated initialization data loaded onto the working memory 3120 (S1030).

The method of initializing operation for the memory system 3000 may terminate the initializing operation and wait for command from the host.

Sixth Embodiment

Figure 9:
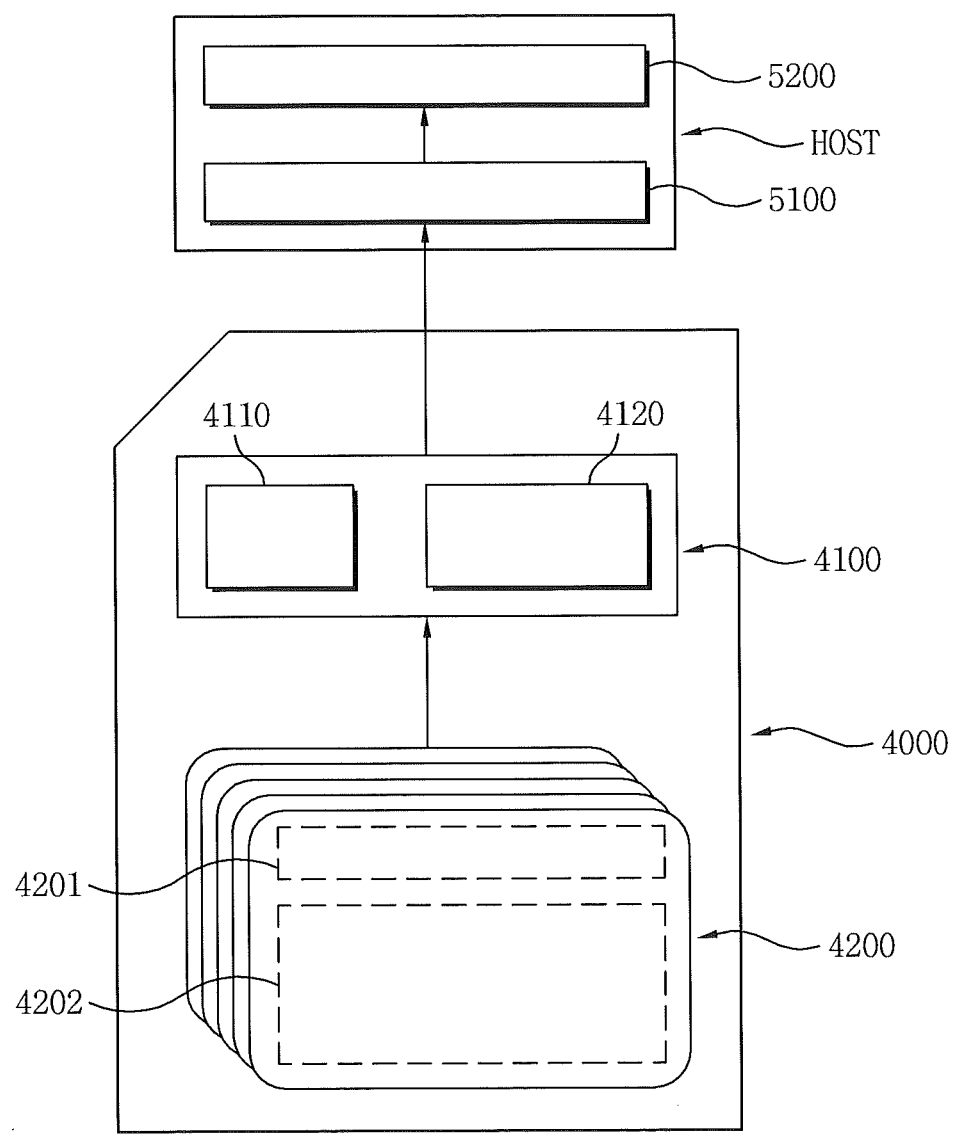
FIG. 9 shows the architecture of a memory system according to a sixth embodiment of the inventive concept.

FIG. 9 shows the architecture of a memory system according to a sixth embodiment of the inventive concept.

Referring to FIG. 9, a memory system 4000 according to the sixth embodiment of the inventive concept may include a controller 4100 and a plurality of non-volatile memory devices 4200 controlled by the controller 4100. The controller 4100 may be connected between a host and the non-volatile memory devices 4200.

The controller 4100 may include a starting memory 4110 and a working memory 4120. Each non-volatile memory device 4200 may include first and second blocks 4201 and 4202 that store different data.

The controller 4100, the starting memory 4110, the working memory 4120, the non-volatile memory device 4200, the first block 4201, and the second block 4202 of the memory system 4000, according to the sixth embodiment of the inventive concept, may be understood to be the same components as the controller 1100, the starting memory 1110, the working memory 1120, the non-volatile memory device 1200, the first block 1201, and the second block 1202 of the memory system 1000 according to the first embodiment of the inventive concept. Thus, detailed description of the former components may be replaced with the content disclosed in the first embodiment of the inventive concept.

The host may include a host driver 5100 and a file system 5200 for controlling the memory system 4000 according to the sixth embodiment of the inventive concept. The file system 5200 may be stored with backup initialization data. The backup initialization data may be data that backs up the initialization data used for the initializing operation after the initializing operation of the memory system 4000 according to the sixth embodiment of the inventive concept is normally terminated.

Figure 10:
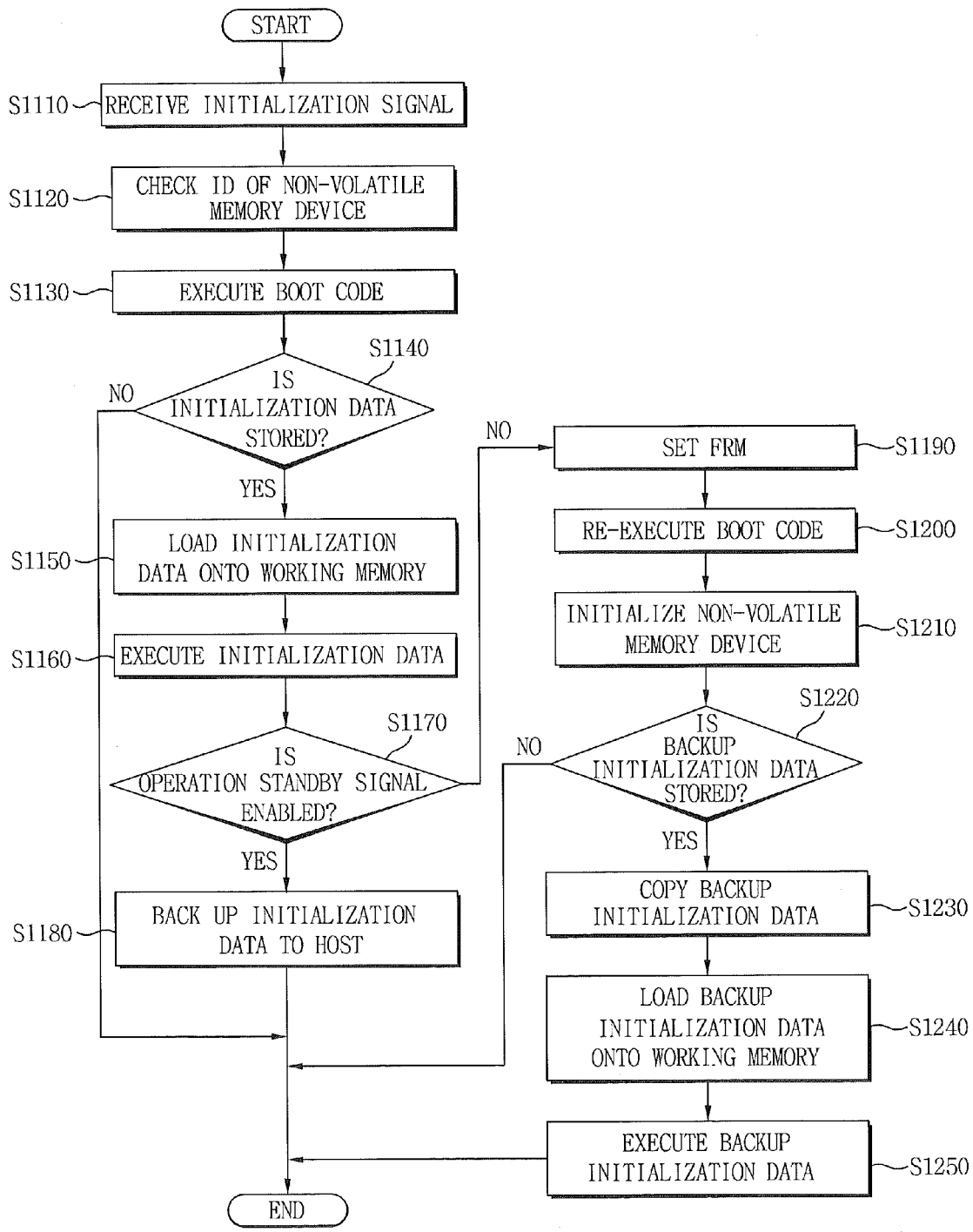
FIG. 10 is a flowchart showing a method of initializing operation for the memory system according to the sixth embodiment of the inventive concept.

FIG. 10 is a flowchart showing a method of initializing operation for the memory system 4000 according to the sixth embodiment of the inventive concept.

Hereinafter, the method of initializing operation for the memory system according to the sixth embodiment of the inventive concept will be described with reference to FIGS. 9 and 10, centering on differences from the method of initializing operation for the memory system according to the first embodiment of the inventive concept.

Referring to FIGS. 9 and 10, the method of initializing operation for the memory system 4000 according to the sixth embodiment of the inventive concept may include receiving an initialization signal from a host (S1110).

Subsequently, the method of initializing operation for the memory system 4000 may include checking identification (ID) of each non-volatile memory device 4200 (S1120).

Next, the method of initializing operation for the memory system 4000 may include executing a boot code stored in the starting memory 4110 in response to the receiving of the initialization signal (S1130), checking whether or not initialization data is stored in the first block 4201 (S1140), loading the initialization data stored in the first block 4201 onto the working memory 4120 (S1150), executing the initialization data (S1160), and checking whether an operation standby signal is enabled by the execution of the initialization data (S1170).

The method of initializing operation for the memory system 4000 may include backing up the initialization data to the host when the operation standby signal is enabled (S1180). The initialization data may be backed up to the file system 5200 of the host.

The method of initializing operation for the memory system 4000 may include setting an FRM when the operation standby signal is not enabled (S1190).

The method of initializing operation for the memory system 4000 may include re-executing the boot code in response to the setting of the FRM (S1200).

The method of initializing operation for the memory system 4000 may include initializing the non-volatile memory device 4200 after the boot code is executed (S1210).

The method of initializing operation for the memory system 4000 may include checking whether or not the backup initialization data is stored in the host (S1220).

When the backup initialization data is not stored in the host, the memory system 4000 may terminate the initializing operation and wait for command from the host.

The method of initializing operation for the memory system 4000 may include copying the backup initialization data stored in the host to the first block 4201 of the non-volatile memory device 4200 (S1230).

The method of initializing operation for the memory system 4000 may include loading the backup initialization data copied to the first block 4201 onto the working memory 4120 (S1240).

The method of initializing operation for the memory system 4000 may copy the backup initialization data stored in the host to the first block 4201, and then load the backup initialization data copied to the first block 4201 onto the working memory 4120. However, the embodiments of the inventive concept are not limited to this configuration. For example, the method of initializing operation for the memory system 4000 may load the backup initialization data stored in the host onto the working memory 4120.

The method of initializing operation for the memory system 4000 may include executing the backup initialization data loaded onto the working memory 4120 (S1250).

The method of initializing operation for the memory system 4000 may terminate the initializing operation and wait for command from the host.

Seventh Embodiment

Figure 11:
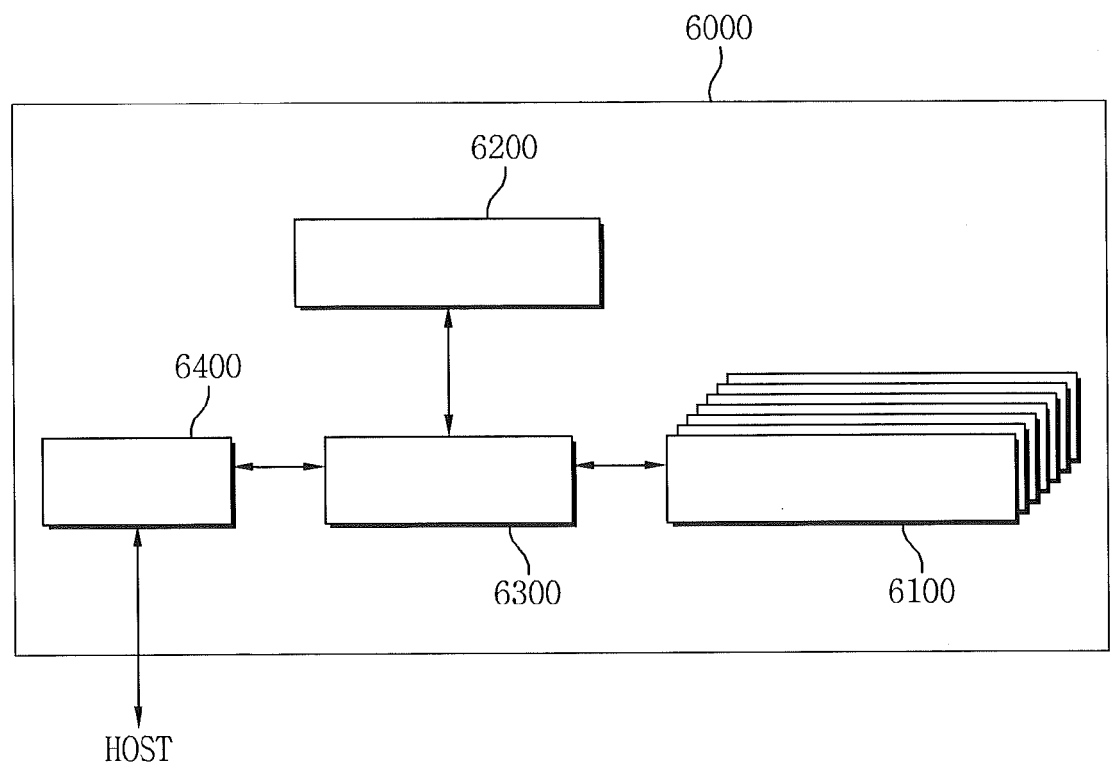
FIG. 11 shows the architecture of a data storage device including the method of initializing operation for the memory system according to a seventh embodiment of the inventive concept.

FIG. 11 shows the architecture of a data storage device including the method of initializing the memory system according to a seventh embodiment of the inventive concept.

Referring to FIG. 11, a data storage device 6000 including the method of initializing operation for the memory system according to the seventh embodiment of the inventive concept may include a non-volatile memory 6100, a buffer memory 6200, a controller 6300 controlling the non-volatile memory 6100 and the buffer memory 6200, and an interface 6400.

The data storage device 6000 may be a solid state drive (SSD). The SSD is a device that stores information using a semiconductor device. Compared to hard disk drives (HDDs), the SSD has high speed, low mechanical latency or failure rate, low generation of heat and noise, and can be made smaller and lightweight. The SSD may be used for laptop personal computers (PCs), desktop PCs, MP3 players, or portable storage devices.

The non-volatile memory 6100 may be mounted adjacent to the controller 6300 and be electrically connected to the controller 6300. The non-volatile memory 6100 may function to store data received from the host via the interface 6400. Thus, the data storage device 6000 may preserve data even when powered off. Data storage capacity of the data storage device 6000 may correspond to the non-volatile memory 6100.

The buffer memory 6200 may be mounted adjacent to the controller 6300 and be electrically connected to the controller 6300. The buffer memory 6200 may include a volatile memory. For example, the buffer memory 6200 may include one or both of a DRAM and an SRAM.

The buffer memory 6200 may serve to temporarily store the data transmitted using the interface 6400 when the data processing speed of the interface 6400 is different from the operating speed of the non-volatile memory 6100. To this end, the buffer memory 6200 may have a relatively rapid speed compared to the non-volatile memory 6100. That is, the data received via the interface 6400 may be temporarily stored in the buffer memory 6200 using the controller 6300, and then be permanently stored in the non-volatile memory 6100 in synchronization with the data write speed of the non-volatile memory 6100. Further, the buffer memory 6200 may temporarily store data that is frequently used among the data stored in the non-volatile memory 6100 in advance. Thus, the buffer memory 620 may increase effective operating speed and reduce error rate of the data storage device 6000.

The controller 6300 may be mounted adjacent to the interface 6400 and be electrically connected to the interface 6400. The controller 6300 may be electrically connected between the interface 6400 and the non-volatile memory 6100, or between the interface 6400 and the buffer memory 6200. The controller 6300 may be a microprocessor including a memory controller and a buffer controller.

The interface 6400 may be connected to the host and serve to transceive electrical signals such as data. For example, the interface 6400 may be a device that exchanges data with the host through an SATA, an IDE, a SCSI, or a combination thereof.

The non-volatile memory 6100, the controller 6300, and the interface 6400 of the data storage device 6000 may constitute the memory system according to the inventive concept. For example, the non-volatile memory 6100 may have a configuration equal or similar to that of the non-volatile memory device 1200 of the memory system 1000 according to the first embodiment of the inventive concept. Further, the controller 6300 and the interface 6400 may have a configuration similar to that of the controller 1100 of the memory system 1000 according to the first embodiment of the inventive concept.

The data storage device 6000 may perform the method of initializing the memory system according to the inventive concept. For example, when receiving an initialization signal from the host, the data storage device 6000 may perform the initializing operation of the method of initializing the memory system according to the first embodiment of the inventive concept. Thus, the data storage device 6000 is allowed to overcome recognition failure caused by initialization data in a user environment, so that it is possible to improve convenience in aspects of manufacturing and usage.

Eighth Embodiment

Figure 12:
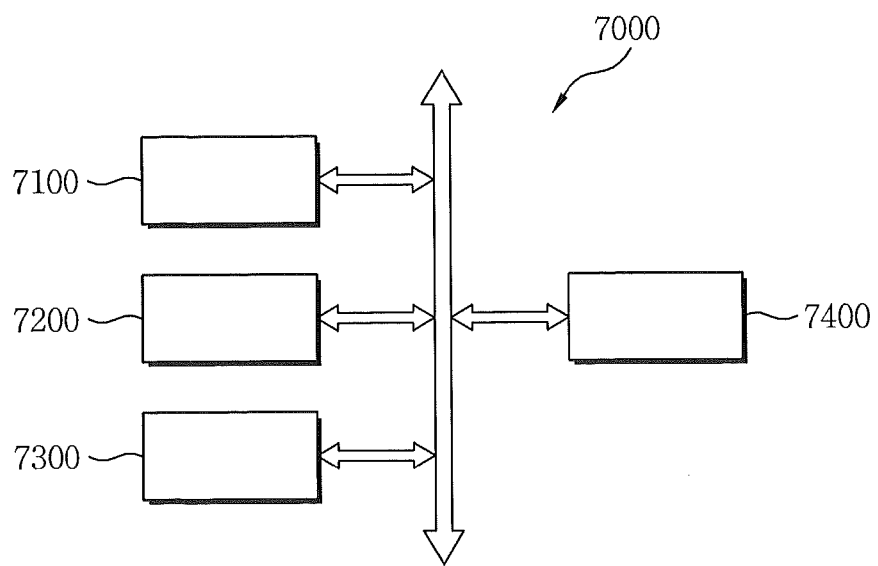
FIG. 12 shows the architecture of an electronic system including the method of initializing operation for the memory system according to an eighth embodiment of the inventive concept.

FIG. 12 shows the architecture of an electronic system including the method of initializing operation for the memory system according to an eighth embodiment of the inventive concept.

Referring to FIG. 12, an electronic system 7000 including the method of initializing operation for the memory system according to the eighth embodiment of the inventive concept may include an interface 7100, a memory system 7200, an input/output unit 7300, and a central processing unit 7400.

The electronic system 7000 may include a personal digital assistant (PDA), a portable computer, a web tablet, a wireless phone, a mobile phone, or a digital music player.

The interface 7100 may exchange data with an external system. The memory system 7200 may be electrically connected with the interface 7100 and the central processing unit 7400. The memory system 7200 may include the controller and the non-volatile memory device of the memory system according to the inventive concept. For example, the memory system 7200 may have the same configuration as the memory system 1000 according to the first embodiment of the inventive concept.

The memory system 7200 may perform the method of initializing operation for the memory system according to the inventive concept. For example, when receiving an initialization signal from the central processing unit 7400, the memory system 7200 may perform the initializing operation of the method of initializing the memory system according to the first embodiment of the inventive concept. Thus, the electronic system 7000 is allowed to overcome recognition failure caused by initialization data in a user environment, so that it is possible to improve convenience in aspects of manufacturing and usage.

The foregoing is illustrative of embodiments and is not to be construed as limiting thereof. Although a few embodiments have been described, those skilled in the art will readily appreciate that many modifications are possible without materially departing from the novel teachings and advantages. Accordingly, all such modifications are intended to be included within the scope of this inventive concept as defined in the claims. In the claims, means-plus-function clauses are intended to cover the structures described herein as performing the recited function, and not only structural equivalents but also equivalent structures. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A method of initializing operation of a memory system, comprising:
   receiving an initialization signal from a host;
   executing boot code stored in a starting memory of a controller in response to the receiving of the initialization signal;
   loading initialization data stored in a non-volatile memory device onto a working memory of the controller in response to the execution of the boot code;
   executing the initialization data loaded onto the working memory;
   re-executing the boot code when an operation standby signal is not enabled by the execution of the initialization data; and
   erasing the initialization data stored in the non-volatile memory device after the boot code is re-executed;
   wherein erasing the initialization data includes initializing the non-volatile memory device;
   wherein initializing the non-volatile memory device includes inquiring of the host whether to initialize the non-volatile memory device, and initializing the non-volatile memory device by command from the host; and
   wherein initializing the non-volatile memory device includes informing that the boot code is re-executed prior to inquiring of the host whether to initialize the non-volatile memory device.

2. The method according to claim 1, further comprising:
   updating new initialization data into the non-volatile memory device after the initialization data is erased;
   loading the updated initialization data onto the working memory; and
   executing the updated initialization data loaded onto the working memory.

3. The method according to claim 2, wherein updating the new initialization data includes inquiring of the host whether to update the new initialization data, and updating the new initialization data by command from the host.

4. The method according to claim 1, further comprising:
   loading preliminary initialization data stored in the non-volatile memory device onto the working memory after the initialization data is erased; and
   executing the preliminary initialization data loaded onto the working memory.

5. The method according to claim 4, further comprising checking whether the preliminary initialization data is stored in the non-volatile memory device prior to loading the preliminary initialization data onto the working memory.

6. The method according to claim 1, further comprising backing up the initialization data to the host when the operation standby signal is enabled by the execution of the initialization data.

7. The method according to claim 6, further comprising:
   loading the backup initialization data stored in the host onto the working memory after the initialization data is erased; and
   executing the backup initialization data loaded onto the working memory.

8. The method according to claim 7, wherein loading the backup initialization data onto the working memory includes copying the backup initialization data into the non-volatile memory device, and loading the backup initialization data copied into the non-volatile memory device onto the working memory.

9. The method according to claim 7, further comprising checking whether the backup initialization data is stored in the host prior to loading the backup initialization data onto the working memory.

10. The method according to claim 1, further comprising setting a forced reset mode (FRM) when the operation standby signal is not enabled by the execution of the initialization data before re-executing the boot code,
   wherein the erasion of the initialization data is performed in response to the setting of the FRM.

11. The method according to claim 10, wherein informing that the boot code is re-executed includes informing the memory system is in the FRM state.

12. The method of initializing operation of a memory system, comprising:
receiving an initialization signal from a host;
executing boot code stored in a starting memory of a controller in response to the receiving of the initialization signal;
loading initialization data stored in a non-volatile memory device onto a working memory of the controller in response to the execution of the boot code;
executing the initialization data loaded onto the working memory;
re-executing the boot code when an operation standby signal is not enabled by the execution of the initialization data;
erasing the initialization data stored in the non-volatile memory device after the boot code is re-executed;
loading preliminary initialization data stored in the non-volatile memory device onto the working memory after the initialization data is erased;
executing the preliminary initialization data loaded onto the working memory; and
checking whether the preliminary initialization data is stored in the non-volatile memory device prior to loading the preliminary initialization data onto the working memory.

13. The method according to claim 12, further comprising:
updating new initialization data into the non-volatile memory device after the initialization data is erased;
loading the updated initialization data onto the working memory; and
executing the updated initialization data loaded onto the working memory.

14. The method according to claim 13, wherein updating the new initialization data includes inquiring of the host whether to update the new initialization data, and updating the new initialization data by command from the host.

15. A method of initializing operation of a memory system, comprising:
receiving an initialization signal from a host;
executing boot code stored in a starting memory of a controller in response to the receiving of the initialization signal;
loading initialization data stored in a non-volatile memory device onto a working memory of the controller in response to the execution of the boot code;
executing the initialization data loaded onto the working memory;
re-executing the boot code when an operation standby signal is not enabled by the execution of the initialization data;
erasing the initialization data stored in the non-volatile memory device after the boot code is re-executed;
backing up the initialization data to the host when the operation standby signal is enabled by the execution of the initialization data;
loading the backup initialization data stored in the host onto the working memory after the initialization data is erased; and
executing the backup initialization data loaded onto the working memory;
wherein loading the backup initialization data onto the working memory includes copying the backup initialization data into the non-volatile memory device, and loading the backup initialization data copied into the non-volatile memory device onto the working memory.

16. The method according to claim 15, further comprising:
updating new initialization data into the non-volatile memory device after the initialization data is erased;
loading the updated initialization data onto the working memory; and
executing the updated initialization data loaded onto the working memory.

17. The method according to claim 16, wherein updating the new initialization data includes inquiring of the host whether to update the new initialization data, and updating the new initialization data by command from the host.

18. The method according to claim 15, further comprising:
loading preliminary initialization data stored in the non-volatile memory device onto the working memory after the initialization data is erased; and
executing the preliminary initialization data loaded onto the working memory.

19. The method according to claim 15, further comprising checking whether the backup initialization data is stored in the host prior to loading the backup initialization data onto the working memory.

* * * * *